3,697,436
PRODUCTION OF URANIUM AND PLUTONIUM CARBIDES AND NITRIDES

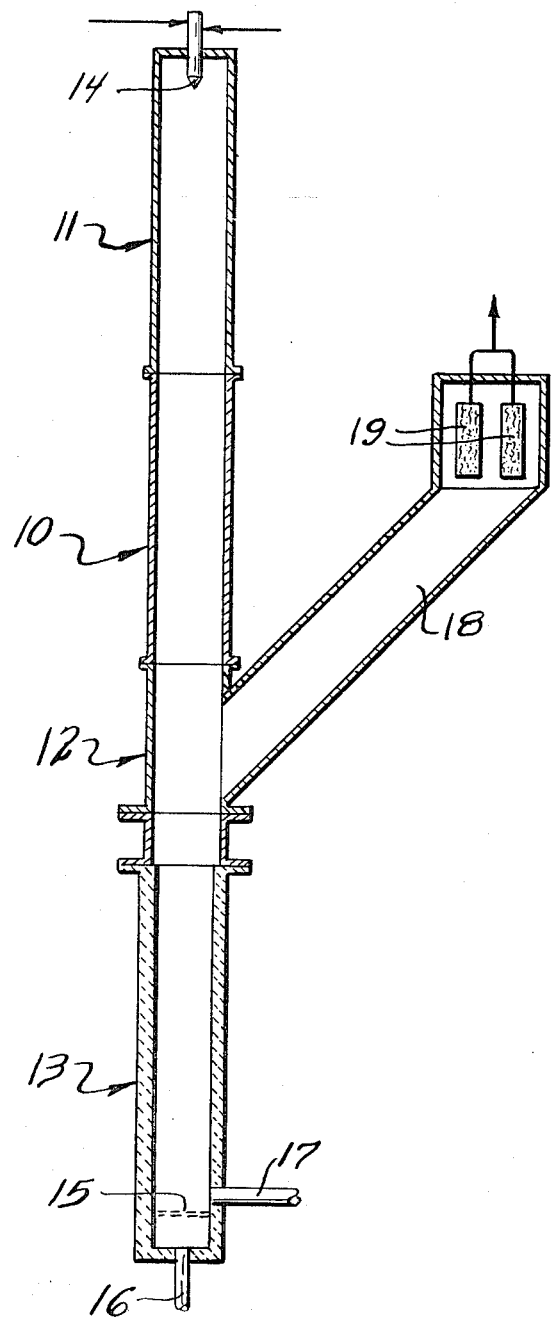

Eugene A. Coppinger, Richland, and Benjamin M. Johnson, Kennewick, Wash., assignors to the United States of America as represented by the United States Atomic Energy Commission
Filed Nov. 26, 1969, Ser. No. 880,067
Int. Cl. C09k 3/02
U.S. Cl. 252—301.1 R                          3 Claims

ABSTRACT OF THE DISCLOSURE

Sugar is dissolved in an aqueous solution of an actinide nitrate, such as uranium and/or plutonium nitrate, and the resulting solution is subjected to radiant-heat spray calcination, producing a calcined mixture of carbon with actinide oxide. This intimately mixed, highly reactive mixture is then heated at a high temperature in the presence of nitrogen to produce actinide nitride or, in the presence of an inert gas, to produce the corresponding carbide.

CONTRACTUAL ORIGIN OF THE INVENTION

The invention described herein was made in the course of, or under, a contract with the United States Atomic Energy Commission.

BACKGROUND OF THE INVENTION

The carbides and nitrides of uranium and plutonium are useful as fuels for nuclear reactors. They are of particular interest for use in fast reactors, i.e. reactors in which the energy of the neutrons is not reduced by the use of moderators. One class of processes for the production of these compounds is known as the carbothermic, in which the oxide (usually the dioxide) of uranium or plutonium, a mixture of uranium dioxide and plutonim dioxide, or a mixed uranium-plutonium oxide, e.g. $(U_xPu_{1-x})O_2$, is heated in intimate admixture with carbon at a temperature of the order of 1600° C. If the heating is carried out in the presence of an inert gas, e.g. argon, the carbide is obtained. If carried out in a nitrogen atmosphere, a nitride or a mixed carbide-nitride is obtained.

Aqueous processes conventionally used for processing nuclear fuel result in production of aqueous nitrate solutions of the actinides present in the fuel. The production of feed material for carbothermic processes from these aqueous solutions has heretofore required several process steps. The procedure involves production of suitable oxides from the nitrate solution, mechanical mixing of the oxides with carbon, pelletizing, crushing and screening.

It is accordingly an object of the present invention to develop a process for producing a highly reactive mixture of actinide oxide from an aqueous solution of actinide nitrate.

It is another object of the present invention to develop a process for producing a highly reactive mixture of actinide oxide from an aqueous solution of actinide nitrate in a single step.

It is still another object of the present invention to develop a process for producing actinide carbide or nitride from an aqueous solution of actinide nitrate in a single operation.

It is also an object of the present invention to develop a process for producing uranium carbide or nitride directly from an aqueous solution of uranyl nitrate.

It is a further object of the present invention to reduce the number of steps required in producing actinide nitride or carbide from an aqueous solution of actinide nitrate.

SUMMARY OF THE INVENTION

These and other objects of the present invention are attained by dissolving sugar in an aqueous solution of an actinide nitrate and spray calcining the resulting solution in a radiant heat spray calciner. The product is a highly reactive mixture of carbon with actinide oxide—in which each particle is an intimate mixture of carbon and actinide oxide—which is converted to the carbide or nitride by heating the mixture in an atmosphere of argon or nitrogen, respectively. Preferably this last step is carried out in the same tower as the spray calcination step by dropping the calcined mixture directly from a portion of the tower in which the spray calcination is carried out through a portion heated to a higher temperature countercurrent to a stream of argon or nitrogen and removing the gases from the tower at midpoint between the spray calcination portion and the high-temperature portion of the tower.

It is known that $UO_3$ can be produced from aqueous solutions of uranyl nitrate by radiant-heat spray calcination—see reports No. K–389 and K–444 (Nuclear Science Abstracts 10–4237 and 11–11660)—and that the radiant-heat spray calcination of radioactive nitrate waste solutions is improved by adding sugar to the solution—see U.S. Pat. No. 3,006,859 and HW–65806 (Nuclear Science Abstracts 15–30303). The sugar acts as a reductant and decomposes to a carbonaceous residue which burns in the presence of added oxygen, increasing the temperature and improving the product. A successful method of producing uranium and/or plutonium nitride by heating uranium and/or plutonium oxide in intimate admixtures with carbon at a temperature on the order of 1600° C. is disclosed in U.S. Pat. 3,510,434, issued May 5, 1970, in the names of Edward T. Weber and Wilbur O. Greenhalgh.

BRIEF DESCRIPTION OF THE DRAWING

The invention will next be described in connection with the accompanying drawing wherein the single figure is a sketch of apparatus which may be used to practice one embodiment of the present invention.

DESCRIPTION OF THE PREFERRED EMBODIMENT

As shown in the drawing, a spray reactor suitable for converting actinide nitrates into actinide carbides and nitrides includes an elongated, vertically disposed tower 10 including an upper section 11 having a heated metal wall wherein an aqueous solution of the actinide nitrate is reduced to dryness and calcined to the oxide, an intermediate disengaging section 12, and a lower section 13 having a heated ceramic wall which serves as a reaction vessel for converting the actinide oxides obtained from section 11 into actinide nitride or carbide. Upper section 11 is operated at 600 to 800° C. and lower section 13 is operated at 1400 to 1650° C. Pneumatic atomizing spray nozzle 14 is located at the top of tower 10 so as to direct the feed solution downwardly into the column and a screen 15 having openings therein smaller than the smallest particles extends across the column near the bottom thereof with an argon or nitrogen inlet line 16 being located below the screen 15, so that the gas flows upwardly through the bed of particles on the screen. A product removal line 17 is located just above screen 15. Finally, disengaging section 12 communicates with a sloping side chamber 18 having filters 19 therein.

Operation of the described apparatus will next be described using a feed consisting of an aqueous solution containing both uranyl and plutonyl nitrate. Sugar is added to this aqueous solution and the resulting feed solution is sprayed into tower 10 through nozzle 14. A typical feed composition is 1.0 to 1.5 M uranium plus plutonium, 1.0 to 1.5 M nitric acid and 1.4 to 1.7 M sugar. Higher metal nitrate concentrations can be achieved by using a sugar-free feed solution and injecting a concentrated sugar solution into the feed stream just prior to the spray nozzle 14. The atomizing gas is nitrogen or argon. Typical gas/liquid weight ratios at the atomizing nozzle are 1.0 to 1.5.

In upper section 11 of tower 10 a mixture of actinide oxide and carbon particles is formed. These particles flow downwardly through this section of the tower together with the atomizing and reaction-product gases to disengaging section 12. The solid particles flow downwardly by gravity through lower section 13 countercurrent to argon or nitrogen gas introduced into the tower through inlet 16. Argon is used when the carbide is to be prepared and nitrogen when the nitride is to be prepared. This gas sweeps the carbon monoxide produced in the carbothermic reaction upward and this gas plus the atomizing gas and the reaction-product gases are taken off from the tower through filters 18 in side chamber 17. Thus, the partial pressure of carbon monoxide in the gas stream around the solids is steadily reduced as the solids flow countercurrent to the flowing gas. The reduced partial pressure of carbon monoxide allows relatively complete conversion of the uranium-plutonium oxide to carbide or nitride at relatively low temperatures.

The powder obtained from the upper low-temperature portion of the tower 10 is uniquely suitable for reaction in the lower high-temperature portion of the tower. Microscopic examination of oxide-carbon particles produced during experimental verification of the process has shown that the particles are very porous agglomerates of extremely small fragments and individual particles contain both actinide oxide and carbon. This visual observation and a low tap density indicate that the powder has a large surface area and that diffusion paths for reaction gases are very short. These inherent physical properties of the powder are conducive to high gas-solid reaction rates which are necessary to reduce holdup time requirements in the high-temperature section of the tower.

Preparation of the carbide or nitride from the powder obtained from upper portion 11 of tower 10 may be carried out in a different manner from that shown, although the one-step process shown is preferred. For example, the oxide-carbon mixture obtained from upper section 11 may be mechanically fed into the top of a second tower where it falls countercurrently to argon or nitrogen passing upwardly therethrough. In addition, the oxide-carbon mixture may be heated in a separate furnace in an atmosphere of argon or nitrogen to form the carbide or the nitride.

Thermodynamic calculations have shown that the one-step process described is operative at the temperatures described if the carbon monoxide formed in the reaction is removed from the reaction zone but that relatively complete conversion to the carbide or nitride will only occur at a much higher temperature if the carbon monoxide is not removed, due to the high partial pressure of carbon monoxide in the reaction gases. At the reaction temperature required under these conditions—1800 to 2000° C.—most potential materials for heating elements, gaskets, insulation and the hot wall develop severe undesirable properties such as permeability, low strength and oxidation.

An experimental program has been undertaken to determine if an intimate mixture of uranium dioxide and carbon can be produced by calcining an aqueous solution of uranyl nitrate, nitric acid and sugar in a spray calciner. Small samples of the uranium dioxide-carbon mixture produced in this manner have been tested for subsequent uranium nitride production.

Fifteen runs were made in an existing spray calciner which is very similar in design to the upper portion 11 of tower 10 shown in the figure. It consists of an insulated tower and necessary auxiliaries to heat the unit, feed the reactants, handle the off-gas, receive the condensate, and collect the product. The heated wall of the spray calciner is 10 feet long and is constructed in three sections. A 4½-foot-long top section and 2-foot-long bottom section are 8-inch Schedule 10 stainless steel pipe. A 3½-foot-long, 8⅜-inch-I.D. center section is 16 gauge Inconel sheet. A disengaging and filter section is attached to the bottom of the reactor. This section is made from 8-inch Schedule 10 stainless steel pipe. A vertical portion directly below the main heated wall is about 2 feet long. A 4-foot-long side chamber slopes upward from the bottom of vertical portion. This side chamber contains four sintered stainless steel filter elements connected to a common manifold and off-gas line.

Solids are collected in a receiver attached to the bottom of the filter section in a direct line with the heated tower. Solids either fall directly into the receiver or are blown downward from the filters by a filter blow-back system.

Feed solution is metered through a pneumatic atomizing nozzle inserted at the center of the top cover plate. Nitrogen is used as the atomizing gas.

In the fifteen experimental runs, the primary variables of temperature, sugar/uranium weight ratio and gas/liquid weight ratio have been studied to determine their effect on product composition. Results indicate that an intimate mixture of $UO_2$ and carbon can be successfully prepared. Carbon content can be readily varied over a wide range that brackets the amount required for subsequent carbide or nitride production. Specifically, the operating conditions for two runs are shown in Table I.

TABLE I.—OPERATING CONDITIONS FOR PRODUCTION OF $UO_2$-C MIXTURES

| Run | 10 | 11 |
|---|---|---|
| Operating conditions: | | |
| Run date | 2/14/68 | 2/15/68 |
| Feed composition: | | |
| U, M | 1.37 | 1.10 |
| $HNO_3$, M | 1.45 | 1.58 |
| Sugar, M | 1.43 | 1.58 |
| Feed flow rate, ml./min | 19.7 | 18.8 |
| Atomizing gas flow, s.c.f.m | 1.16 | 1.10 |
| Gas/liquid weight ratio | 1.28 | 1.49 |
| Temperature range in tower, ° C | 600–800 | 600–800 |

The average carbon content in the powder from Runs 10 and 11 was 10.3 and 15 wt. percent, respectively. The stoichiometric carbon requirement for the carbothermic reaction is 11.76 wt. percent for uranium carbide production and 8.16 wt. percent for uranium nitride production. X-ray diffraction studies show that the uranium is present predominantly as $UO_2$.

Small samples of the powder from Runs 10 and 11 were tested for conversion to uranium nitride. The equipment essentially consists of a graphite resistance furnace, temperature monitoring and control instruments, oxygen and water analyzers for the reaction gas, and a carbon monoxide monitor for the exhaust gas. Approximately 1.5 grams of $UO_2$-C powder from Runs 10 and 11 were loaded into individual 1½-inch-diameter, tungsten-lined molybdenum crucibles. The crucibles were placed in the furnace and the system was purged with ultra-pure helium for over 16 hours. A helium flow rate of 0.5 liter/min. was then established and the samples were heated to 450° C. in 75 minutes. The furnace was then switched to automatic control for a programmed rise to 1600° C. at a rate of 600° C./hr. At 1250° C. nitrogen gas at a flow rate of 2 liters/min. was introduced into the furnace in place of helium. The CO monitor indicated an immediate reaction as nitrogen was introduced. The reaction was complete in 45 minutes although the nitrogen flow and temperature were held another 90 minutes. The CO monitor indicated an abrupt CO reduction at the end of of the reacting solid particles. Analytical results after the reaction. This indicates rapid diffusion of CO out the conversion tests are shown in Table II.

TABLE II.—SAMPLE COMPOSITION AFTER CONVERSION TO URANIUM NITRIDE

| Sample | $N_2$, wt. percent | Oxygen, p.p.m. | Carbon, p.p.m. |
|---|---|---|---|
| Run: | | | |
| 10 | [1] 5.34 | [1] 7,800 | 350 |
| 11 | 5.37 | 13,000 | 35,000 |

[1] Average of duplicate samples.

The material using $UO_2$-C from Run 10 looks reasonably good as a nitride since both the oxygen and carbon content are reasonably low in the sample. The stoichiometric amount of nitrogen in uranium nitride is 5.55 wt. percent. The material from Run 11 contains too much residual carbon as would be expected from the greater carbon content in the $UO_2$-C test mixture.

It has thus been shown that the process in its broadest aspects is operative. As will now be shown, it is also apparent that the preferred embodiments of the invention is also operative.

The essential process conditions for operation of the lower zone of the reactor are the following:

Temperature 1400–1650° C. The upper temperature is preferred for rapid reaction rate and more favorable thermodynamics but may be limited by consideration of the materials of construction Upward flow of $N_2$ (for nitride formation) or argon (for carbide formation) at a velocity just slightly less than the settling velocity of the particles. This is estimated to be about 0.1 ft./sec.

A configuration at the bottom of the column which allows continuous upflow of hot $N_2$ or Ar gas through the bed of powder that settles at that location. This may not be necessary for operability but would probably be desirable.

It is anticipated that the reaction as represented by the equation $$UO_2 + 2C + \tfrac{1}{2}N_2 \rightarrow UN + 2CO$$

will be largely completed by the time the particles have traversed the lower section of the reactor; this despite the statement that in a tube furnace the reaction was complete in 45 minutes. The rationale for this statement is as follows. The tube furnace experiment involved contacting a packed bed of powder with the nitrogen. Under these conditions the countercurrent diffusion of reactant and product gases within the bed is the rate limiting step. It is not anticipated that the chemical kinetics of the reaction is rate limiting because of the highly reactive form of carbon produced by the dehydration of sugar in the spray calciner. In the proposed configuration, individual particles would be in contact with the reactant gas rather than a packed bed of powder and diffusion need take place only through the particle.

Further assurance of complete reaction is obtained from the provision for continued permeation of the incoming hot nitrogen (or argon) through the settled bed of particles at the bottom of the reactor.

The following calculations indicate the reaction times expected under these conditions.

The reaction time in the formation of UN from $UO_2$, C is probably governed by the rate of mass transfer of nitrogen gas into the freely falling particles. With the assumption that the rate of the chemical reaction is not a rate limiting step, an estimate of the time for reaction can be made according to the principles given in pages 338–350 of Chemical Reaction Engineering by O. Levenspiel (Wiley, 1962). Heat transfer rate limiting steps are excluded because of the high chemical reaction rate and the very high driving force for heat transfer into the particle.

The two probable rate limiting steps are diffusion through the previously reacted material surrounding the unreacted core of the particle and diffusion through the gas film. With diffusion through the solid material limiting, the time for completion of reaction of a 10-micron particle is estimated to be 0.01 second. With diffusion through the gas film, a reaction time of 0.014 second is estimated. A combined reaction time of about 0.02 second is estimated. This is a reasonable contact time for a free-fall chamber.

CALCULATIONS

Diffusion through the reacted shell as the rate limiting factor $$\text{Reaction time } \tau = \frac{\rho_B R^2}{6bDC_{Ag}}$$

(Eq. 12.20, p. 349, Levenspiel)

$\tau$ = reaction time, seconds.
$\rho_B$ = bulk density of UN product, 5 g./cm.$^3$.
R = radius of particle, conservatively assumed to be 5 microns or $5 \times 10^{-4}$ cm. (unagglomerated particles from the spray calciner are broken spherical shells with diameters of about $10\mu$ and thicknesses of about $1\mu$).
b = moles of $UO_2$ reacting per mole of nitrogen, 0.5.
D = gaseous counter diffusion coefficient of nitrogen in carbon monoxide at 1500° C., 0.3 cm.$^2$/sec. or $3 \times 10^{-4}$ ft.$^2$/sec. (This assumes open pores in the particle and that there is no adsorption of the gases on the UN.)
$C_{Ag}$ = concentration of nitrogen in the gas phase at 1500° C., $2 \times 10^{-4}$ g./cm.$^3$.

$$\tau = \frac{(5)(0.0005)^2}{(6)(0.5)(0.3)(2 \times 10^{-4})} = 0.01 \text{ second}$$

Diffusion through the gas film surrounding the particle as the rate limiting factor $$\text{Reaction time } \tau = \frac{\rho_B R}{3bk_gC_{Ag}}$$

(Eq. 12.7, p. 346, Levenspiel)

where $k_g$ is the mass transfer coefficient across the gas film (600 cm./sec. estimated from Eq. 12 (22), p. 351, Levenspiel)

$$\tau = \frac{(5)(0.0005)}{(3)(0.5)(600)(2 \times 10^{-4})} = 0.014 \text{ second}$$

Since both resistances to mass transfer are comparable, the time for reaction is estimated to be about 0.02 second, which is a reasonable contact time for a free-fall chamber.

It will be understood that the invention is not to be limited by the details given herein but that it may be modified within the scope of the appended claims.

The embodiments of the invention in which an exclusive property or privilege is claimed are defined as follows:

1. A method of producing an actinide nitride comprising dissolving sugar in an aqueous solution of actinide nitrate, spraying this solution into the top of a spray calciner having walls heated to a temperature of 600 to 800° C., the amount of sugar added to the solution being effective to produce an intimate highly reactive calcined mixture of carbon and actinide dioxide in the spray calciner, withdrawing reaction product gases from the product stream from the spray calciner, and forming said actinide nitride without intermediate treatment by heating said calcined mixture after the said reaction product gases have been withdrawn to a temperature in the range of 1400–1650° C. in the presence of nitrogen.

2. A method according to claim 1 wherein the actinide nitrate is uranium nitrate, plutonium nitrate or a mixture of uranium and plutonium nitrates.

3. A method according to claim 2 wherein the calcined mixture is dropped directly from the spray calciner through a reaction vessel having walls heated to a temperature in the range of 1400–1650° C. against an upwardly flowing current of nitrogen, said upward flow being just slightly less than the settling velocity of the particles, the nitrogen being removed along with the reaction product gases between the bottom of the spray calciner and the top of the reaction vessel.

References Cited

UNITED STATES PATENTS

| | | | |
|---|---|---|---|
| 3,510,434 | 5/1970 | Weber et al. | 252—301.1 |
| 3,406,228 | 10/1968 | Hardy et al. | 252—301.1 X |
| 3,006,859 | 10/1961 | Allemann et al. | 252—301.1 WD |

FOREIGN PATENTS

| | | | |
|---|---|---|---|
| 1,176,631 | 10/1962 | Germany | 23—346 |

OTHER REFERENCES

Nuclear Science Abstracts, vol. 11, #11660, "Spray Decomposition of Uranyl Nitrate Solution to Uranium Trioxide," Allen et al., July 15, 1949.

Nuclear Science Abstracts, vol. 15, #30303, "Radiant-Heat Spray-Calcination Process for the Solid Fixation of Radioactive Waste. Part I," Allemann et al., February 1961.

Nuclear Science Abstracts, vol. 10, #4237, "Uranium Recovery from Decontamination Solutions by Spray Decomposition," Allen et al., Apr. 27, 1949.

McMurtry: "Studies of the Preparation of Mixed Fuel Utilizing Coprecipitation," Nuclear Science Abstracts, vol. 22, May 1968, #19609 (NYO–3713–3).

CARL D. QUARFORTH, Primary Examiner

E. E. LEHMANN, Assistant Examiner

U.S. Cl. X.R.

23—344, 346, 349